(12) United States Patent
Xiong et al.

(10) Patent No.: US 11,134,484 B2
(45) Date of Patent: Sep. 28, 2021

(54) PHYSICAL DOWNLINK CONTROL CHANNEL, PDCCH, SEARCH SPACE DESIGN FOR FIFTH GENERATION, 5G, AND LATENCY REDUCTION

(71) Applicant: Intel Corporation, Santa Clara, CA (US)

(72) Inventors: Gang Xiong, Portland, OR (US); Glenn J. Bradford, Hillsboro, OR (US); Sungho Moon, San Jose, CA (US); Hong He, Sunnyvale, CA (US); Jong-Kae Fwu, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 247 days.

(21) Appl. No.: 16/095,740

(22) PCT Filed: Sep. 27, 2016

(86) PCT No.: PCT/US2016/053964
§ 371 (c)(1),
(2) Date: Oct. 23, 2018

(87) PCT Pub. No.: WO2017/204844
PCT Pub. Date: Nov. 30, 2017

(65) Prior Publication Data
US 2020/0280965 A1    Sep. 3, 2020

Related U.S. Application Data

(60) Provisional application No. 62/340,319, filed on May 23, 2016.

(51) Int. Cl.
*H04W 72/04*    (2009.01)

(52) U.S. Cl.
CPC ....... *H04W 72/042* (2013.01); *H04W 72/044* (2013.01)

(58) Field of Classification Search
CPC .. H04W 72/042; H04W 72/044; H04W 72/04
See application file for complete search history.

(56) References Cited

U.S. PATENT DOCUMENTS

2011/0228724 A1\* 9/2011 Gaal ..................... H04L 5/0094
370/328
2012/0252447 A1\* 10/2012 Sartori .................. H04W 24/10
455/434

(Continued)

FOREIGN PATENT DOCUMENTS

WO    2017/065826 A1    4/2017

OTHER PUBLICATIONS

"Consideration on S-PDCCH design for latency reduction." Agenda Item: 6.2.10.1. Source: Intel Corporation. 3GPP TSG-RAN WG1 #85, Nanjing, China, May 23-27, 2016. R1-164161. 6 pages.

(Continued)

*Primary Examiner* — Chi Ho A Lee
*Assistant Examiner* — Andrew Lee
(74) *Attorney, Agent, or Firm* — Schwabe, Williamson & Wyatt, P.C.

(57) ABSTRACT

Techniques for xPDCCH (5G (Fifth Generation) Physical Downlink Control Channel) design are discussed. In various aspects, xPDCCH can be transmitted via one or more OFDM (Orthogonal Frequency Division Multiplexing) symbols, with each OFDM symbol comprising a xPDCCH search space. Each xPDCCH search space can have one or two distinct xPDCCH sets, with each xPDCCH set having a xCCE (5G Control Channel Element) starting position that can be based on one of several predetermined rules, and can depend on one or more factors.

21 Claims, 11 Drawing Sheets

(56) References Cited

U.S. PATENT DOCUMENTS

| | | | |
|---|---|---|---|
| 2013/0003604 A1* | 1/2013 | Blankenship | H04L 5/0023 370/255 |
| 2013/0003663 A1* | 1/2013 | Blankenship | H04L 5/0053 370/329 |
| 2013/0301549 A1* | 11/2013 | Chen | H04B 7/024 370/329 |
| 2014/0092830 A1* | 4/2014 | Chen | H04W 72/042 370/329 |
| 2014/0247816 A1* | 9/2014 | Kim | H04W 72/0446 370/336 |
| 2015/0296933 A1* | 10/2015 | Salvaggio Bradshaw | A44C 9/0061 63/1.14 |
| 2015/0341918 A1* | 11/2015 | Yang | H04W 68/005 370/312 |
| 2016/0205664 A1* | 7/2016 | Zhang | H04W 72/0453 370/312 |
| 2017/0289981 A1* | 10/2017 | Kim | H04L 1/1614 |
| 2017/0290008 A1* | 10/2017 | Tooher | H04L 1/0007 |
| 2017/0318566 A1* | 11/2017 | Deogun | H04L 1/1851 |
| 2019/0068352 A1 | 2/2019 | Xiong et al. | |
| 2019/0081820 A1* | 3/2019 | Urabayashi | H04L 27/0006 |

OTHER PUBLICATIONS

"Consideration on sPDCCH Design." Agenda Item: 6.2.10.1. Source: InterDigital. 3GPP TSG RAN WG1 Meeting #85, Nanjing, China May 23-27, 2016. R1-165049. 4 pages.

"3rd Generation Partnership Project; Technical Specification Group Radio Access Network; Evolved Universal Terrestrial Radio Access (E-UTRA); Physical layer procedures (Release 13)." 3GPP Standard; 3GPP TS 36.213, 3rd Generation Partnership Project (3GPP) vol. RAN WG1, No. V13.1.1. 31. Mar. 2016. 210 pages.

"3rd Generation Partnership Project; Technical Specification Group Radio Access Network; Evolved Universal Terrestrial Radio Access (E-UTRA); Physical layer procedures (Release 13)." 3GPP TS 36.213 V13.2.0 (Jun. 2016). Lte Advanced Pro. 6 pages.

"3rd Generation Partnership Project; Technical Specification Group Radio Access Network; Evolved Universal Terrestrial Radio Access (E-UTRA); Physical layer procedures (Release 13)." 3GPP TS 36.213 V13.2.0 (Jun. 2016). Lte Advanced Pro. 38 pages.

"3rd Generation Partnership Project; Technical Specification Group Radio Access Network; Evolved Universal Terrestrial Radio Access (E-UTRA); Physical layer procedures (Release 13)." 3GPP TS 36.213 V13.2.0 (Jun. 2016). Lte Advanced Pro. 210 pages.

"3rd Generation Partnership Project; Technical Specification Group Radio Access Network; Evolved Universal Terrestrial Radio Access (E-UTRA); Physical layer procedures (Release 13)." 3GPP TS 36.213 V13.2.0 (Jun. 2016). Lte Advanced Pro. 80 pages.

"3rd Generation Partnership Project; Technical Specification Group Radio Access Network; Evolved Universal Terrestrial Radio Access (E-UTRA); Physical layer procedures (Release 13)." 3GPP TS 36.213 V13.2.0 (Jun. 2016). Lte Advanced Pro. 36 pages.

"3rd Generation Partnership Project; Technical Specification Group Radio Access Network; Evolved Universal Terrestrial Radio Access (E-UTRA); Physical layer procedures (Release 13)." 3GPP TS 36.213 V13.2.0 (Jun. 2016). Lte Advanced Pro. 11 pages.

International Search Report and Written Opinion dated Jan. 23, 2017 for International Patent Application PCT/US2016/053964.

* cited by examiner

PHYSICAL DOWNLINK CONTROL CHANNEL, PDCCH, SEARCH SPACE DESIGN FOR FIFTH GENERATION, 5G, AND LATENCY REDUCTION

REFERENCE TO RELATED APPLICATIONS

This application is a National Phase entry application of International Patent Application No. PCT/US2016/053964 filed Sep. 27, 2016, which claims priority to U.S. Provisional Application 62/340,319 filed on May 23, 2016, entitled "PDCCH SEARCH SPACE DESIGN FOR 5G AND LATENCY REDUCTION" in the name of Gang Xiong et al. and is hereby incorporated by reference in its entirety.

FIELD

The present disclosure relates to wireless technology, and more specifically to techniques for design of a PDCCH (physical downlink control channel) search space for 5G (fifth generation).

BACKGROUND

Mobile communication has evolved significantly from early voice systems to today's highly sophisticated integrated communication platform. The next generation wireless communication system, 5G (Fifth Generation), will provide access to information and sharing of data anywhere, anytime by various users and applications. 5G is expected to be a unified network/system that targets to meet vastly different and sometime conflicting performance dimensions and services. Such diverse multi-dimensional goals are driven by different services and applications. In general, 5G will evolve based on 3GPP (Third Generation Partnership Project) LTE (Long Term Evolution)-Advanced with additional potential new Radio Access Technologies (RATs) to enrich lives with better, simple and seamless wireless connectivity solutions. 5G will enable everything connected by wireless and deliver fast, rich contents and services.

DETAILED DESCRIPTION

Figure 1:
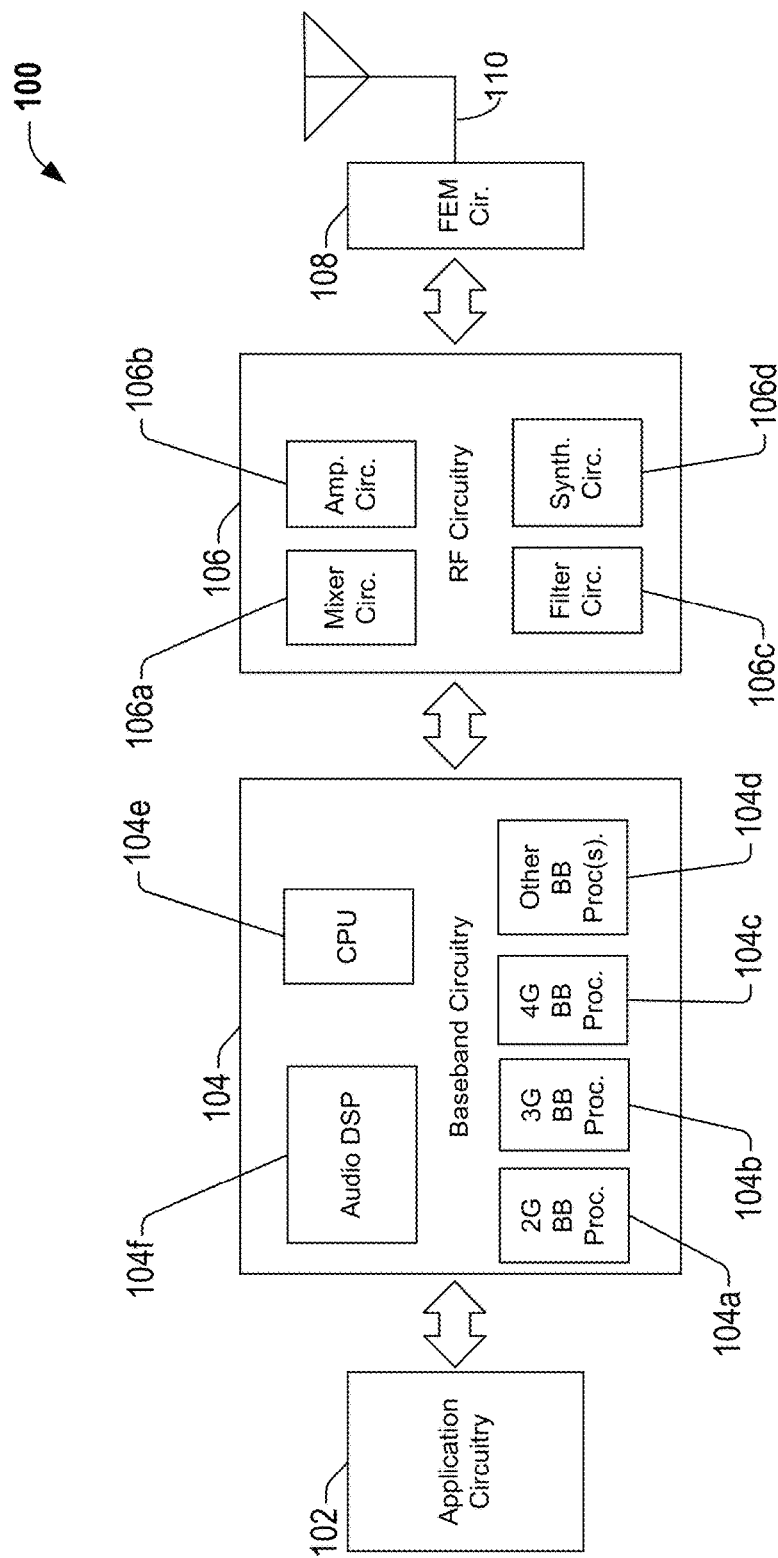
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuity 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110. In some embodiments, the UE device 100 may include additional elements such as, for example, memory/storage, display, camera, sensor, and/or input/output (I/O) interface.

Additionally, although the above example discussion of device 100 is in the context of a UE device, in various aspects, a similar device can be employed in connection with a base station (BS) such as an Evolved NodeB (eNB).

In various embodiments, techniques discussed herein can be employed for design of a xPDCCH (5G (Fifth Generation) PDCCH (Physical Downlink Control Channel)) search space, transmission of xPDCCH to one or more UEs by an eNB (Evolved Node B), and/or blind decoding of xPDCCH by a UE. In various aspects discussed herein, details are discussed that can be employed in connection with a PDCCH search space design for 5G and latency reduction.

Figure 2:
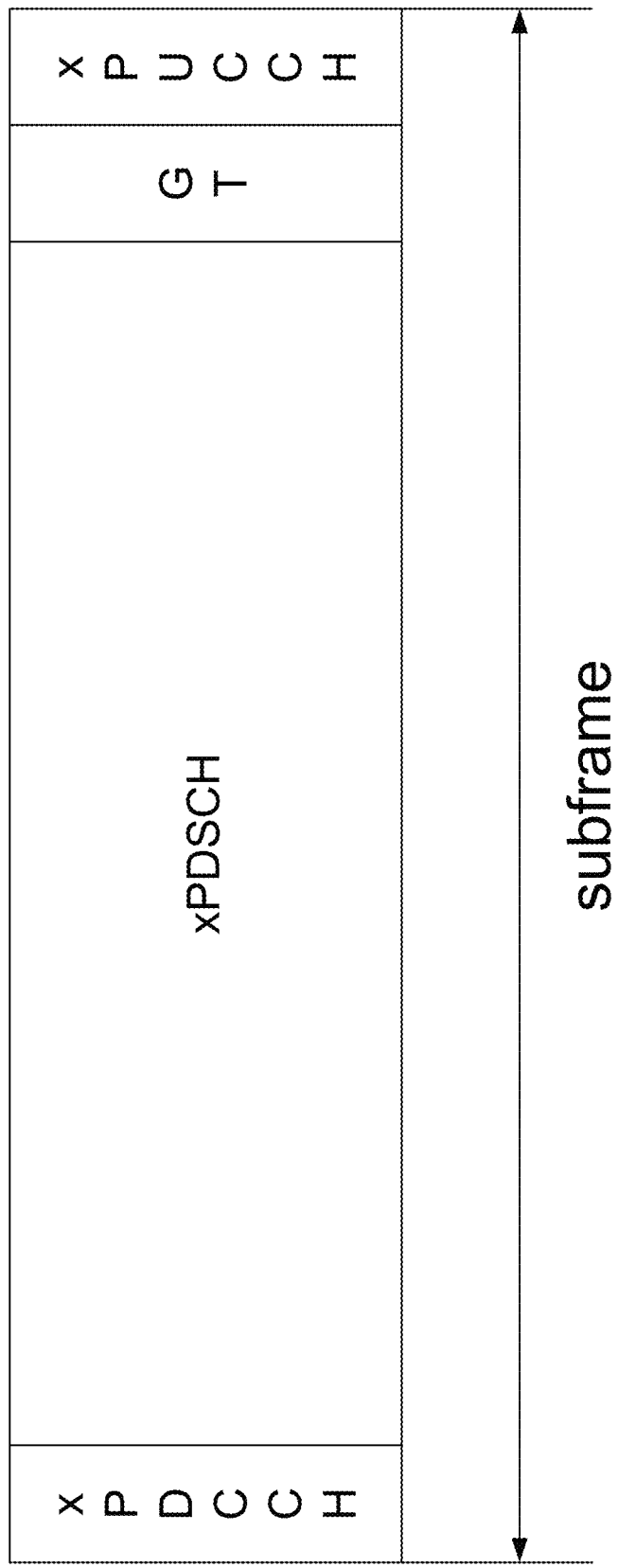
FIG. 2 is a diagram illustrating an example of a self-contained TDD subframe structure in the DL (Downlink) that can be employed in connection with various aspects described herein.

To enable low latency transmission for enhanced mobile broadband communication, a self-contained TDD (Time Division Duplexing) subframe can be employed. Referring to FIG. 2, illustrated is a diagram showing an example of a self-contained TDD subframe structure in the DL (Downlink) that can be employed in connection with various aspects described herein. In the example subframe of FIG. 2, a 5G physical downlink shared channel (xPDSCH) can be scheduled by a 5G physical downlink control channel (xPDCCH) and can be transmitted right after the xPDCCH (in the same subframe). Guard time (GT) can be inserted between xPDSCH and a 5G physical uplink control channel (xPUCCH) in order to accommodate the DL to UL (uplink) and UL to DL switching time and round-trip propagation delay.

For 5G systems, high frequency band communication is of interest, since it can provide wider bandwidth to support the future integrated communication system. Beam forming technology can be employed in high frequency band systems, due to the fact that the beam forming gain can compensate for the severe path loss caused by atmospheric attenuation, can improve the SNR, and can enlarge the coverage area. By aligning the transmission beam to the target UE, the radiated energy can be focused for higher energy efficiency, and the mutual UE interference can be suppressed.

As depicted in FIG. 2, xPDCCH and the data channel can be multiplexed in a time division multiplexing (TDM) manner. Further, to increase xPDCCH capacity, one or more symbols can be allocated for xPDCCH transmission, where the number of symbols can be configured by higher layers. Per-symbol based xPDCCH transmission can be employed, where Demodulation Reference Signal (DM-RS) can be embedded in the associated xPDCCH transmission. In the example of FIG. 2, Downlink Control Information (DCI), which is carried by xPDCCH, is confined within one symbol.

Figure 3:
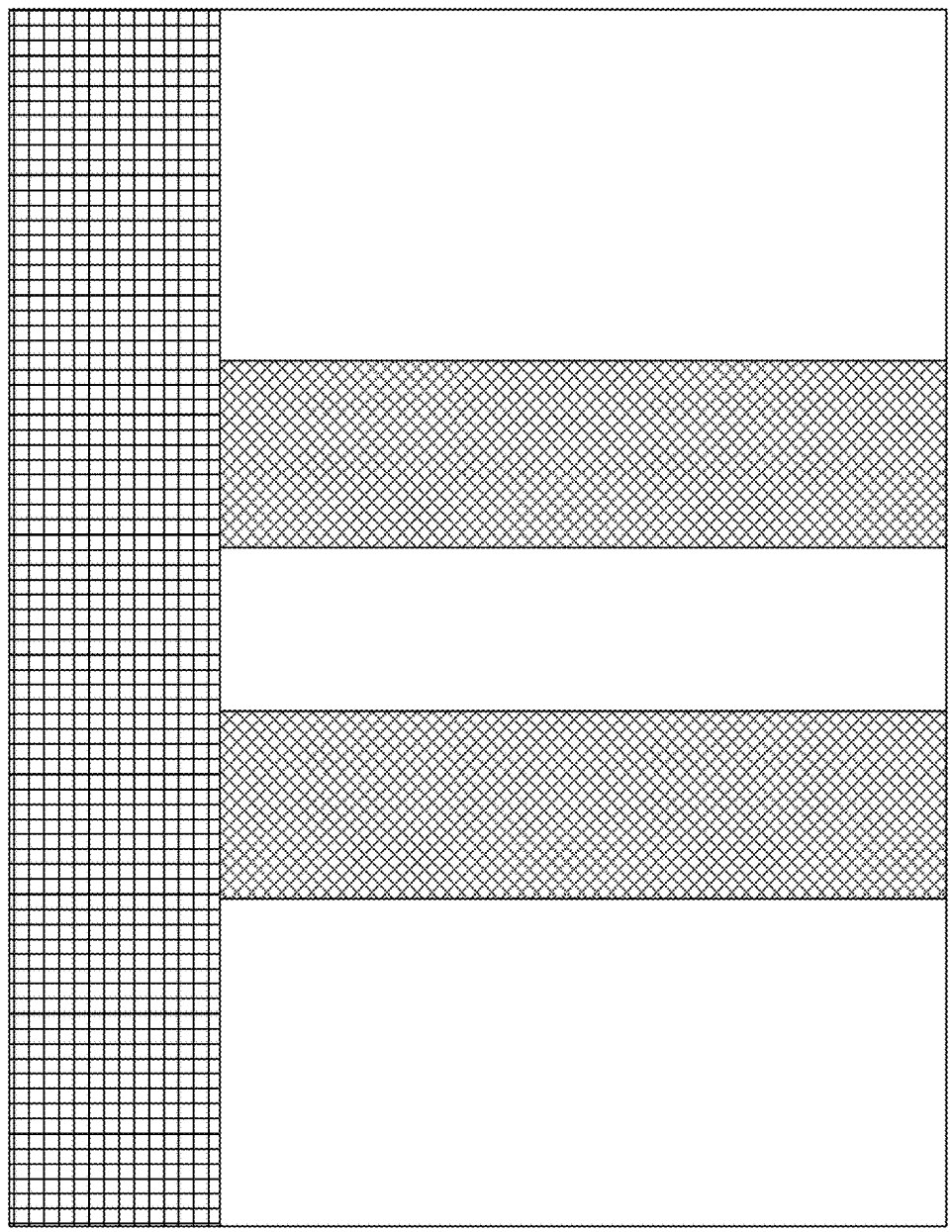
FIG. 3 is a diagram illustrating the PDCCH (Physical Downlink Control Channel) and EPDCCH (Enhanced PDCCH) design in a conventional LTE system associated with various aspects described herein.

In conventional LTE systems, PDCCH can span up to 3 orthogonal frequency-division multiplexing (OFDM) symbols (or 4 if the system bandwidth is 1.4 MHz) at the start of the subframe. In Rel-11 (release 11) LTE, enhanced physical downlink control channel (EPDCCH) was introduced to increase the control channel capacity. Referring to FIG. 3, illustrated is a diagram showing the PDCCH and EPDCCH design in a conventional LTE system associated with various aspects described herein. As shown in FIG. 3, PDCCH spans the first 3 or 4 OFDM symbols and occupies the full system bandwidth, while EPDCCH spans the remaining OFDM symbols after the legacy PDCCH region and occupies a few PRBs, depending on the configuration.

As defined in the LTE specification, for conventional LTE systems, a search space is a set of candidate control channels which are formed by control channel elements (CCEs) on a given aggregation level. The UE can attempt to decode the DCI messages within the search space. In order to reduce the blocking probability, a UE specific search space is defined as a function of Cell Radio Network Temporary Identifier (C-RNTI) and subframe index. Dependence on the subframe index results in the UE specific search spaces is time varying, which helps resolve blocking between UEs. Further, for the EPDCCH search space, each UE can be configured with one or two EPDCCH sets, each comprising two, four, or eight PRB pairs, and for each EPDCCH set, different search spaces are defined.

More specifically, for PDCCH, the starting CCE position is a function of $Y_k$ which is defined (in 3GPP TS (technical specification) 36.213) as (with subclause references to TS 36.213):

For the common search spaces, $Y_k$ is set to 0 for the two aggregation levels L=4 and L=8.

For the UE-specific search space $S_k^{(L)}$ at aggregation level L, the variable $Y_k$ is defined by $$Y_k = (A \cdot Y_{k-1}) \bmod D$$

where $Y_{-1} = n_{RNTI} \neq 0$, A=39827, D=65537 and $k = \lfloor n_s/2 \rfloor$, $n_s$ is the slot number within a radio frame. The RNTI value used for $n_{RNTI}$ is defined in subclause 7.1 in downlink and subclause 8 in uplink.

For EPDCCH, starting enhanced CCE (ECCE) position is defined as:

The variable $Y_{p,k}$ is defined by $$Y_{p,k} = (A_p \cdot Y_{p,k-1}) \bmod D$$

where $Y_{p,k} = n_{RNTI} \neq 0$, $A_0$=39827, $A_1$=39829, D=65537 and $k = \lfloor n_s/2 \rfloor$, $n_s$ is the slot number within a radio frame. The RNTI value used for $n_{RNTI}$ is defined in subclause 7.1 in downlink and subclause 8 in uplink.

xPDCCH Search Space Design

For xPDCCH design according to various aspects described herein, one or two xPDCCH sets can be configured for each OFDM symbol. The frequency resources configured for each xPDCCH set in these OFDM symbols can be the same or different.

Various embodiment for the xPDCCH search space (SS) design are discussed below.

In a first set of embodiments, the xPDCCH search space for different OFDM symbols can be same. In the case when two xPDCCH sets are configured in each OFDM symbols, the starting xCCE position or search space for different xPDCCH sets can be different, but in other aspects the starting xCCE position or search space for each xPDCCH set in different OFDM symbols can be the same.

In one example, the xPDCCH search space can employ a design similar to the existing search space design in LTE EPDCCH in scenarios in which one or two xPDCCH sets can be configured for each UE. More specifically, the xPDCCH UE specific search space can be defined as a function of C-RNTI and subframe index.

Figure 4:
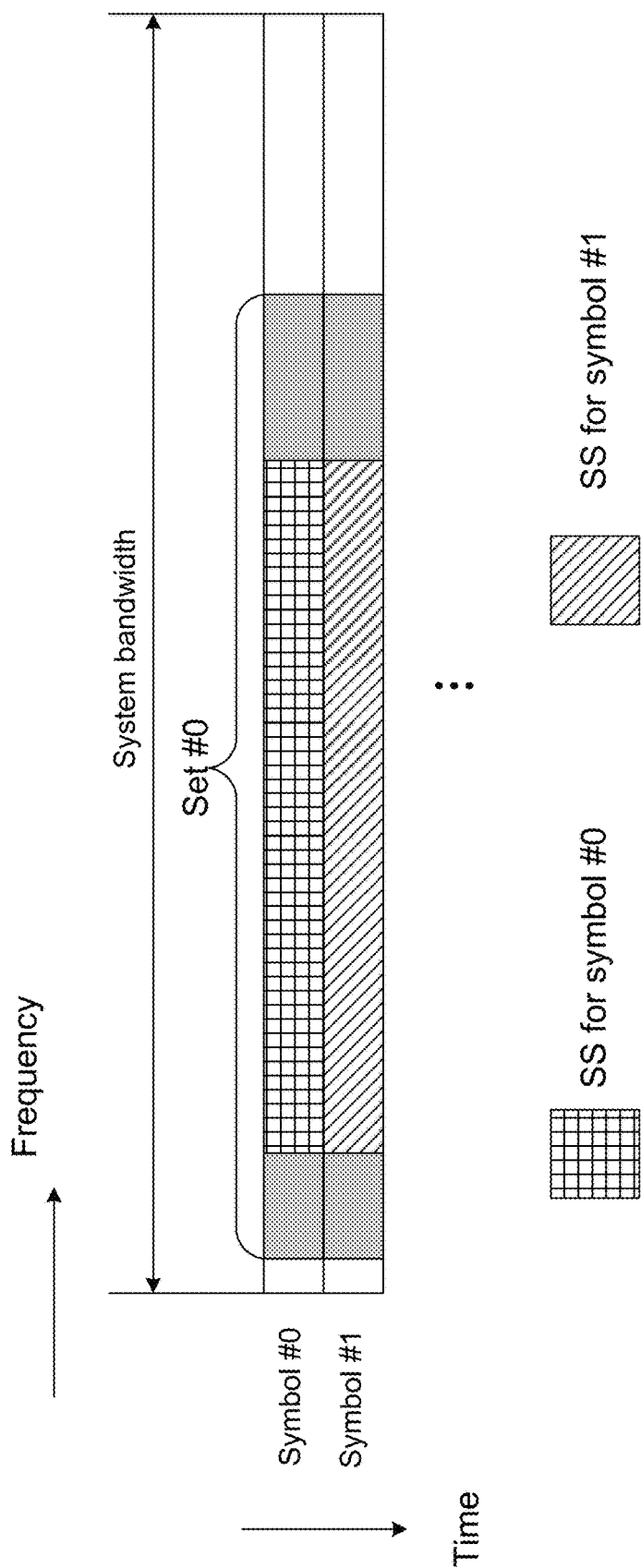
FIG. 4 is a diagram illustrating one example of an xPDCCH (5G (Fifth Generation) PDCCH) design with a common xPDCCH search space design for different OFDM (Orthogonal Frequency Division Multiplexing) symbols according to various aspects described herein.

Referring to FIG. 4, illustrated is a diagram showing one example of an xPDCCH design with a common xPDCCH search space design for different OFDM symbols according to various aspects described herein. In the example of FIG. 4, one xPDCCH set can be configured and the same xPDCCH set can be defined for different OFDM symbols. Note that the example of FIG. 4 can be straightforwardly extended to the case when two xPDCCH sets are configured in each OFDM symbol.

In a second set of embodiments, different starting xCCE positions can be defined for different ODFM symbols. In various aspects of this set of embodiments, a fixed offset can be defined for the starting xCCE positions for different OFDM symbols, whereby the offset can be predefined in the specification or can be configured by higher layers (e.g., via a 5G master information block (xMIB), a 5G system information block (xSIB), or RRC (radio resource control) signaling).

In the case when only one xPDCCH set is defined for each OFDM symbol, the starting xCCE positions can be defined as follows:
The variable $Y_{k,l}$ is defined by $$Y_{k,l}=Y_{k,0}+l\cdot\Delta_{SS}$$

Where l is the OFDM symbol index within one subframe; $\Delta_{SS}$ is a fixed offset;

$$Y_{k,0}=(A\cdot Y_{k-1,0})\bmod D$$

Where $Y_{-1,0}=n_{RNTI}\neq 0$, A=39827, D=65537 and $k=\lfloor n_s/2 \rfloor$, $n_s$ is the slot number within a radio frame. The RNTI value used for $n_{RNTI}$ is defined in subclause 7.1 in downlink and subclause 8 in uplink.

In the case when up to two xPDCCH sets are configured for each OFDM symbol, the starting xCCE positions can be defined as follows:
The variable $Y_{k,p,l}$ is defined by $$Y_{k,p,l}=Y_{k,p,0}+l\cdot\Delta_{SS}$$

Where l is the OFDM symbol index within one subframe; $\Delta_{SS}$ is a fixed offset;

$$Y_{k,p,0}=(A_p\cdot Y_{k-1,p,0})\bmod D$$

Where $Y_{-1,p,0}=n=n_{RNTI}\neq 0$, $A_0=39827$, $A_1=39829$, D=65537 and $k=\lfloor n_s/2 \rfloor$, $n_s$ is the slot number within a radio frame. The RNTI value used for $n_{RNTI}$ is defined in subclause 7.1 in downlink and subclause 8 in uplink.

The xPDCCH search space design aspects discussed above (as well as other design aspects discussed herein) can be applied for the common search space and/or UE specific search space.

Figure 5:
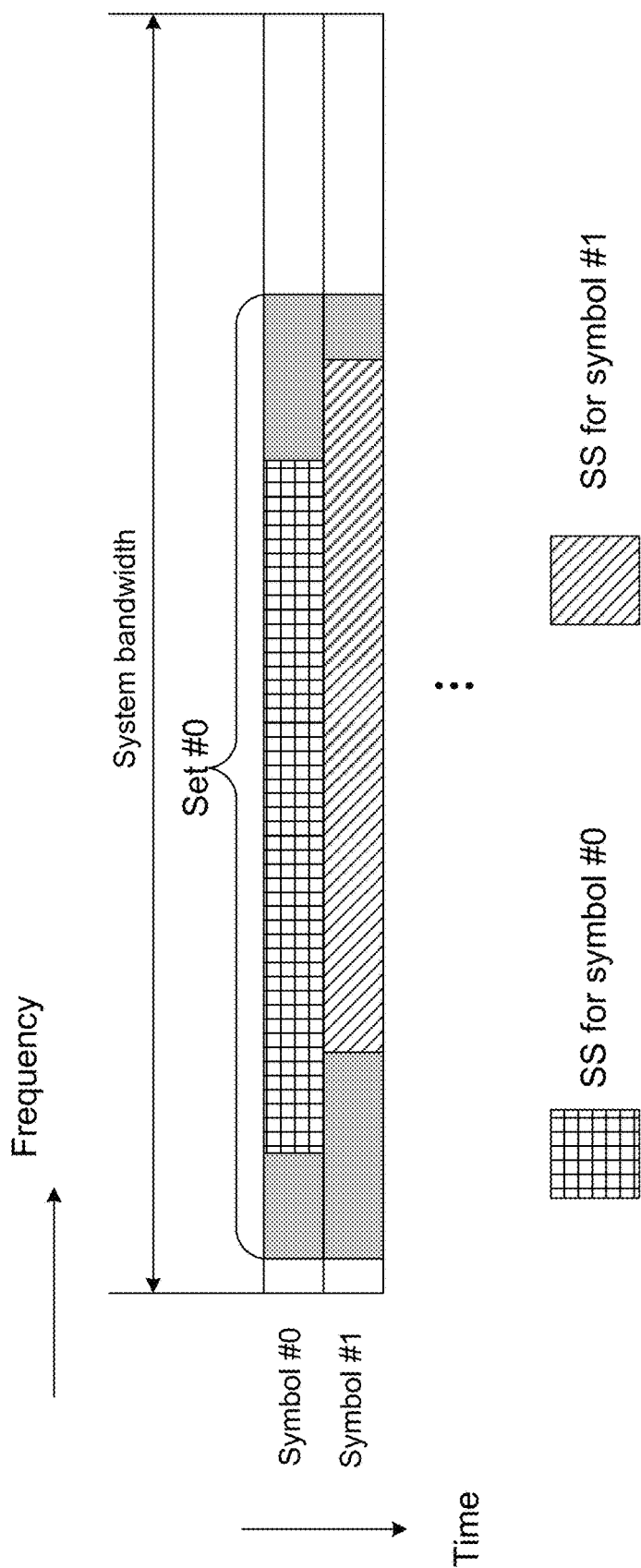
FIG. 5 is a diagram illustrating one example of an xPDCCH design with different starting xCCE (5G Control Channel Element) positions for different OFDM symbols with a fixed offset according to various aspects described herein.

Referring to FIG. 5, illustrated is a diagram showing one example of an xPDCCH design with different starting xCCE positions for different OFDM symbols with a fixed offset according to various aspects described herein. In the example of FIG. 5, only one xPDCCH set is configured for each OFDM symbol. However, the example of FIG. 5 can be straightforwardly extended to the case when two xPDCCH sets are configured in each OFDM symbol.

In a third set of embodiments, different starting xCCE positions can be defined for different OFDM symbols and/or different xPDCCH sets. In various aspects, starting xCCE positions can be defined as a function of C-RNTI, subframe index, symbol index and/or xPDCCH set index. Additionally, in various such aspects, the hashing table to calculate the starting xCCE positions for different OFDM symbols and/or different xPDCCH sets can be initialized with different initial constants. xPDCCH designs according to such embodiments can help to further reduce the blocking probability for xPDCCH transmission.

In the case when only one xPDCCH set is defined for each OFDM symbol, the starting xCCE positions can be defined as follows:
The variable $Y_{k,l}$ is defined by $$Y_{k,l}=(A_l\cdot Y_{k-1,l})\bmod D$$

Where $Y_{-1,l}=n_{RNTI}\neq 0$, $A_0=39827$, $A_1=39829$, D=65537 and $k=\lfloor n_s/2 \rfloor$, $n_s$ is the slot number within a radio frame, l is the OFDM symbol index within one subframe. The RNTI value used for $n_{RNTI}$ is defined in subclause 7.1 in downlink and subclause 8 in uplink.

In the above example, $A_l$, ($l\geq 2$) can be constants, which can be predefined (e.g., in the specification).

In another option, the starting xCCE positions can be defined as follows:
The variable $Y_k$ is defined by $$Y_k=(A\cdot Y_{k-1})\bmod D$$

Where $Y_{-1}=n_{RNTI}\neq 0$, A=39827, D=65537 and $k=N_{xPDCCH}^{sym}\cdot\lfloor n_s/2 \rfloor+l$, $n_s$ is the slot number within a radio frame, $N_{xPDCCH}^{sym}$ is the number of symbols for xPDCCH within one subframe, l is the OFDM symbol index within one subframe. The RNTI value used for $n_{RNTI}$ is defined in subclause 7.1 in downlink and subclause 8 in uplink.

In the above example, $N_{xPDCCH}^{sym}$ can be fixed/predefined (e.g., in the specification) or can be configured by higher layers via xMIB, xSIB or RRC signaling.

In the case when up to two xPDCCH sets are configured for each OFDM symbol, the starting xCCE positions can be defined as follows:
The variable $Y_{k,p,l}$ is defined by $$Y_{k,p,l}=(A_{p,l}\cdot Y_{k-1,p,l})\bmod D$$

Where $Y_{-1,p,l}=n_{RNTI}\neq 0$, $A_{0,0}=39827$, $A_{1,0}=39829$, D=65537 and $k=\lfloor n_s/2 \rfloor$, $n_s$ is the slot number within a radio frame, l is the OFDM symbol index within one subframe. The RNTI value used for $n_{RNTI}$ is defined in subclause 7.1 in downlink and subclause 8 in uplink.

In the above example, $A_{p,l}$, (p=0, 1 and $l\geq 1$) can be constants, which can be predefined (e.g., in the specification).

In another option, the starting xCCE positions can be defined as follows:
The variable $Y_{k,p}$ is defined by $$Y_{k,p}=(A_p\cdot Y_{k-1,p})\bmod D$$

Where $Y_{-1,p}=n_{RNTI}\neq 0$, $A_0=39827$, $A_1=39829$, D=65537 and $k=N_{xPDCCH}^{sym}\cdot\lfloor n_s/2 \rfloor+l$, $n_s$ is the slot number within a radio frame, $N_{xPDCCH}^{sym}$ is the number of symbols for xPDCCH within one subframe, l is the OFDM symbol index within one subframe. The RNTI value used for $n_{RNTI}$ is defined in subclause 7.1 in downlink and subclause 8 in uplink.

As with other xPDCCH design options discussed herein, the design aspects discussed above can be applied for the common search space and/or the UE specific search space.

Figure 6:
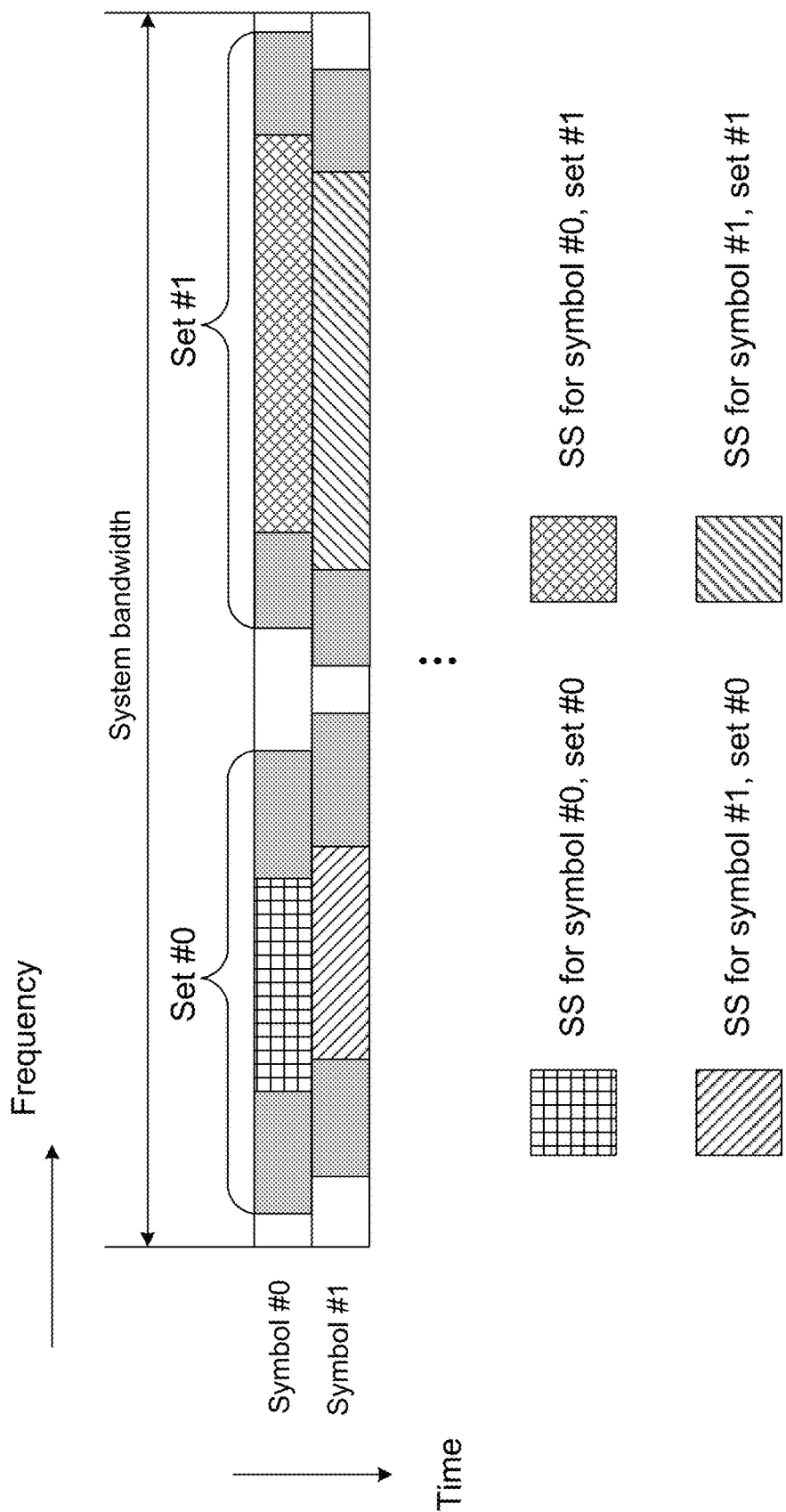
FIG. 6 is a diagram illustrating one example of an xPDCCH design with different starting xCCE positions for different OFDM symbols and different xPDCCH sets in each ODFM symbol according to various aspects described herein.

Referring to FIG. 6, illustrated is a diagram showing one example of an xPDCCH design with different starting xCCE positions for different OFDM symbols and different xPDCCH sets in each ODFM symbol according to various aspects described herein. In the example of FIG. 6, two xPDCCH sets are configured for each OFDM symbol. Further, different search spaces are defined for each OFDM symbol and xPDCCH set.

S-PDCCH Search Space Design for Latency Reduction

Figure 7:
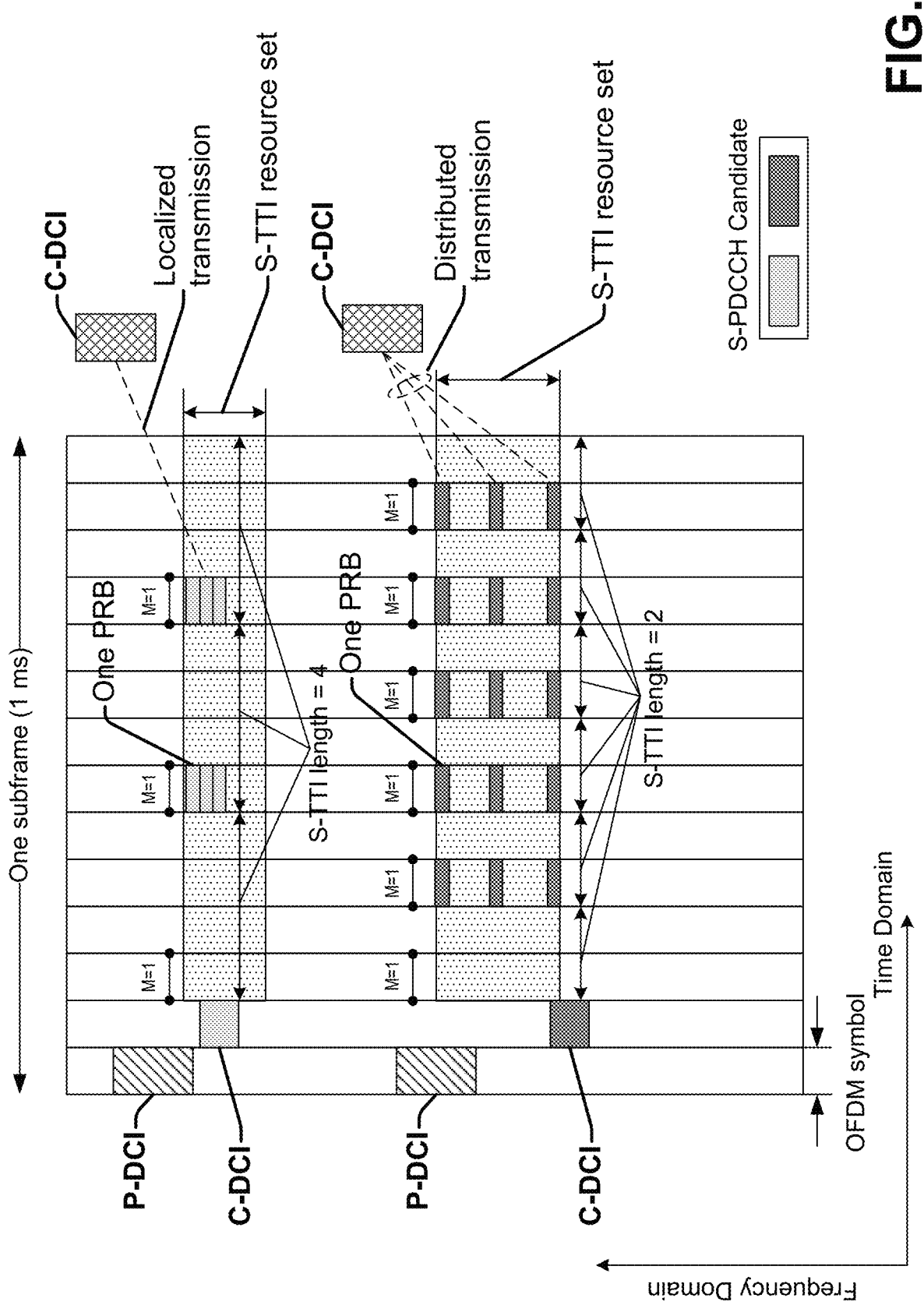
FIG. 7 is a diagram illustrating two examples of two step DCI (Downlink Control Information) transmission schemes for latency reduction that can be employed in connection with various aspects described herein.

For latency reduction, two step DCI transmission schemes can be defined within one subframe. As an example, Parent-DCI (i.e. P-DCI) can be used to refer to the DCI format on a conventional PDCCH and Child-DCI (i.e. C-DCI) can be used to refer to the associated DCI format that can be transmitted on a shortened PDCCH (S-PDCCH) for a corresponding P-DCI format. Referring to FIG. 7, illustrated is a diagram showing two examples of two step DCI transmission schemes for latency reduction that can be employed in connection with various aspects described herein.

In various aspects, one or more of the xPDCCH design options discussed herein can be applied for the search space design for S-PDCCH. For example, in various aspects, the search space for S-PDCCH can be defined as a function of C-RNTI, subframe index, symbol index and/or xPDCCH set index. Alternatively, in various aspects, the search space for shortened PDCCH (S-PDCCH) can be defined as a function of C-RNTI, subframe index, shortened Transmission Time Interval (S-TTI) index and/or xPDCCH set index.

Figure 8:
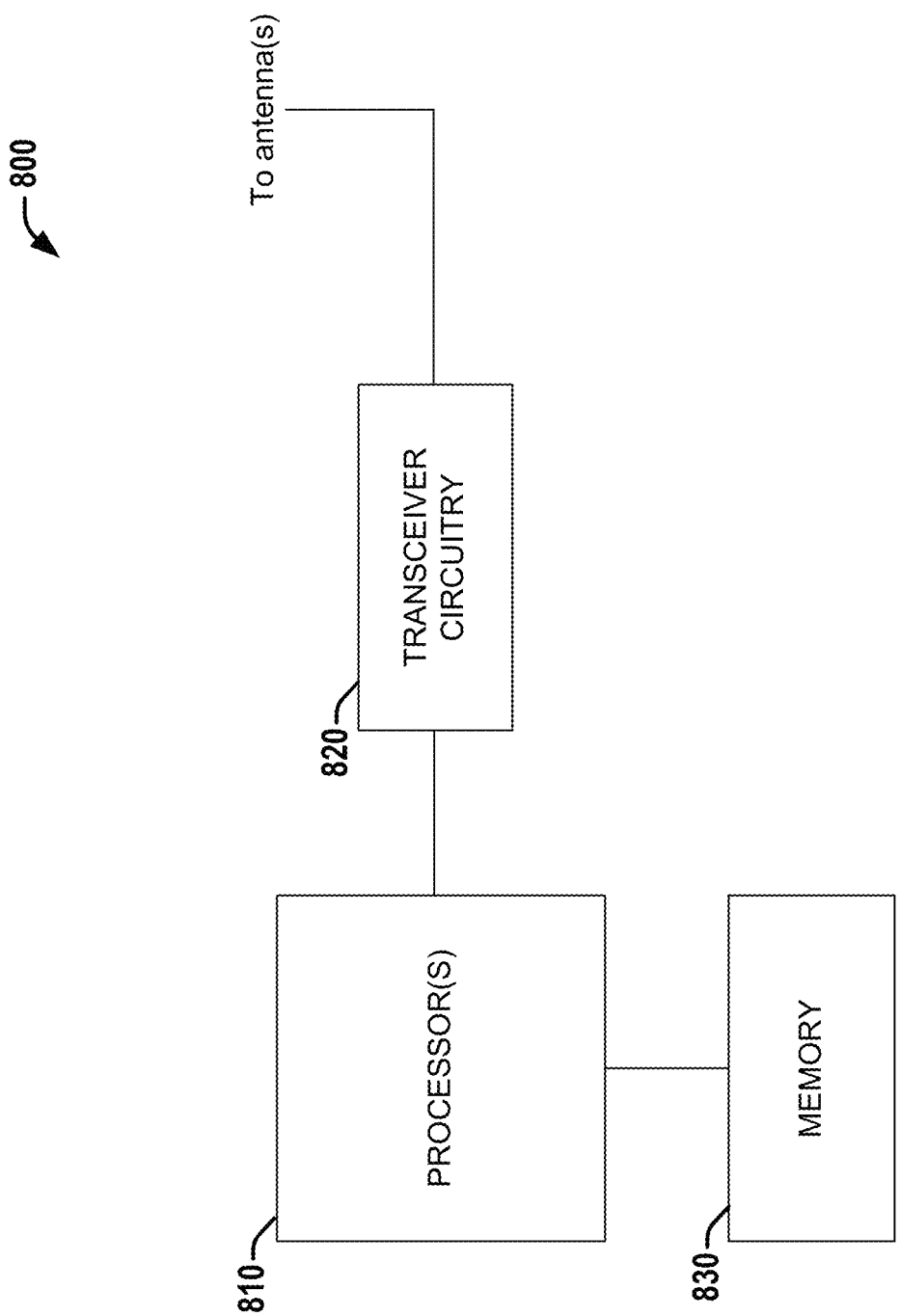
FIG. 8 is a block diagram of a system that facilitates blind decoding of xPDCCH at a UE based on an xPDCCH design according to various aspects described herein.

Referring to FIG. 8, illustrated is a block diagram of a system 800 that facilitates blind decoding of xPDCCH at a UE, according to various aspects described herein. System 800 can include one or more processors 810 (e.g., one or more baseband processors such as one or more of the baseband processors discussed in connection with FIG. 1), transceiver circuitry 820 (e.g., comprising one or more of transmitter circuitry or receiver circuitry, which can employ common circuit elements, distinct circuit elements, or a combination thereof), and a memory 830 (which can comprise any of a variety of storage mediums and can store instructions and/or data associated with one or more of processor(s) 810 or transceiver circuitry 820). In various aspects, system 800 can be included within a user equipment (UE). As described in greater detail below, system 800 can facilitate determination of a xPDCCH common search space and/or user specific search space for blind decoding.

Transceiver circuitry 820 can receive (and processor(s) 810 can process) xPDCCH via one or more OFDM symbols (e.g., the first one or more OFDM symbols) of a subframe (e.g., a self-contained subframe such as shown in connection with FIG. 2, in some aspects). Depending on the type of received signal or message, processing (e.g., by processor(s) 810, processor(s) 910, etc.) can comprise one or more of: identifying physical resources associated with the signal/message, detecting the signal/message, resource element group deinterleaving, demodulation, descrambling, and/or decoding.

Based on the received xPDCCH for each OFDM symbol, processor(s) 810 can determine one or more corresponding xPDCCH search spaces (e.g., a common search space and/or a UE-specific search space). Processor(s) 810 can perform blind decoding on the xPDCCH search space(s) to attempt to decode one or more xDCI messages associated with the UE employing system 800.

Processor(s) 810 can determine the corresponding xPDCCH search space(s) (e.g., of the one or more OFDM symbols) based on any of the predefined rules provided herein for xPDCCH design (e.g., mapping the xPDCCH search space to xCCE(s)). For example, each xPDCCH search space can comprise one or two xPDCCH sets (e.g., one continuous set, or two sets separated by one or more xCCEs), and starting xCCE positions of each xPDCCH set can be the same or different for different OFDM symbols (e.g., if different, starting xCCE positions between OFDM symbols can vary based on a fixed offset, which can be predefined or configured via xMIB, xSIB, xRRC, etc.).

In various aspects, the xCCE starting position of each xPDCCH set can depend on one or more of C-RNTI, subframe index, slot number, symbol index, the number of OFDM symbols for xPDCCH in the subframe (e.g., $N_{xPDCCH}^{sym}$) or xPDCCH set index. The xCCE starting position can be initialized via a hashing table, which can be a function of one or more of the values indicated herein that the xCCE starting position can depend upon (e.g., C-RNTI, subframe index, etc.).

Alternatively, in various aspects, system 800 can be similarly employed in connection with S-PDCCH. In such aspects, the xCCE starting position can optionally depend upon a shortened Transmission Time Interval (S-TTI) index.

Figure 9:
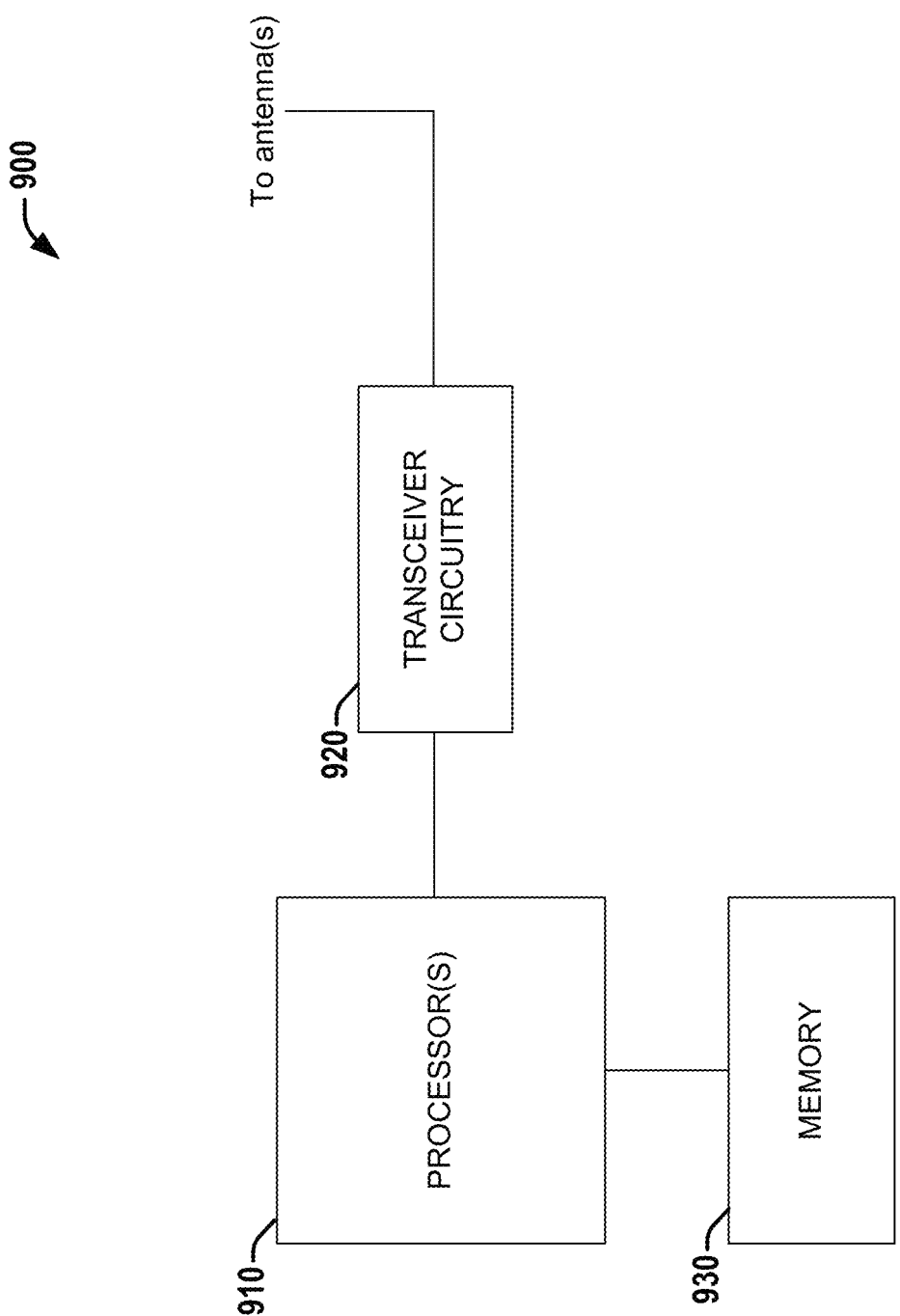
FIG. 9 is a block diagram of a system that facilitates generation of xPDCCH by an eNB based on an xPDCCH design according to various aspects described herein.

Referring to FIG. 9, illustrated is a block diagram of a system 900 that facilitates generation of xPDCCH by an eNB according to various aspects described herein. System 900 can include one or more processors 910 (e.g., one or more baseband processors such as one or more of the baseband processors discussed in connection with FIG. 1), transceiver circuitry 920 (e.g., which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 930 (which can comprise any of a variety of storage mediums and can store instructions and/or data associated with one or more of processor(s) 910 or transceiver circuitry 920). In various aspects, system 900 can be included within an Evolved Universal Terrestrial Radio Access Network (E-UTRAN) Node B (Evolved Node B, eNodeB, or eNB) or other base station in a wireless communications network. In some aspects, the processor(s) 910, transceiver circuitry 920, and the memory 930 can be included in a single device, while in other aspects, they can be included in different devices, such as part of a distributed architecture. As described in greater detail below, system 900 can generate xPDCCH for one or more OFDM symbols based on techniques described herein.

Processor(s) 910 can determine one or more (e.g., $N_{xPDCCH}^{sym}$) OFDM symbols for xPDCCH transmission in a subframe (e.g., a self-contained subframe for DL (such as shown in FIG. 2) or for UL). In some aspects, processor(s) 910 can determine the value to be a predefined value for $N_{xPDCCH}^{sym}$. In other aspects, processor(s) 910 can select the value of $N_{xPDCCH}^{sym}$, and can configure one or more UEs with the value of $N_{xPDCCH}^{sym}$ via higher layer signaling (e.g., xMIB, xSIB, RRC, etc.).

Processor(s) 910 can generate one or more xDCI messages and map each xDCI message to a xPDCCH search space (e.g., common search space or UE-specific search space) of the $N_{xPDCCH}^{sym}$ OFDM symbols for transmission by transmitter circuitry 920. Depending on the type of signal or message generated, outputting for transmission (e.g., by processor(s) 810, processor(s) 910, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.).

Processor(s) 910 can determine the xCCE(s) to map the xDCI message(s) to based on one of the rules for xPDCCH (or S-PDCCH) design discussed herein. For example, each xPDCCH search space can comprise one or two xPDCCH sets (e.g., with each xPDCCH set comprising a continuous set of xCCEs, separated by one or more xCCEs in scenarios involving two xPDCCH sets). xCCE starting positions can be initialized based on a hashing table as discussed herein, for example, based on one or more of C-RNTI, subframe index, slot number, symbol index, the number of OFDM symbols for xPDCCH in the subframe (e.g., $N_{xPDCCH}^{sym}$), or xPDCCH set index (and/or S-TTI index in S-PDCCH aspects). As specific examples, xPDCCH search spaces of different OFDM symbols can have the same or different starting xCCE positions. In aspects wherein the starting xCCE position differs between OFDM symbols, the offset can be predefined or can be configured by processor(s) 910 via higher layer signaling (e.g., xMIB, xSIB, RRC).

Figure 10:
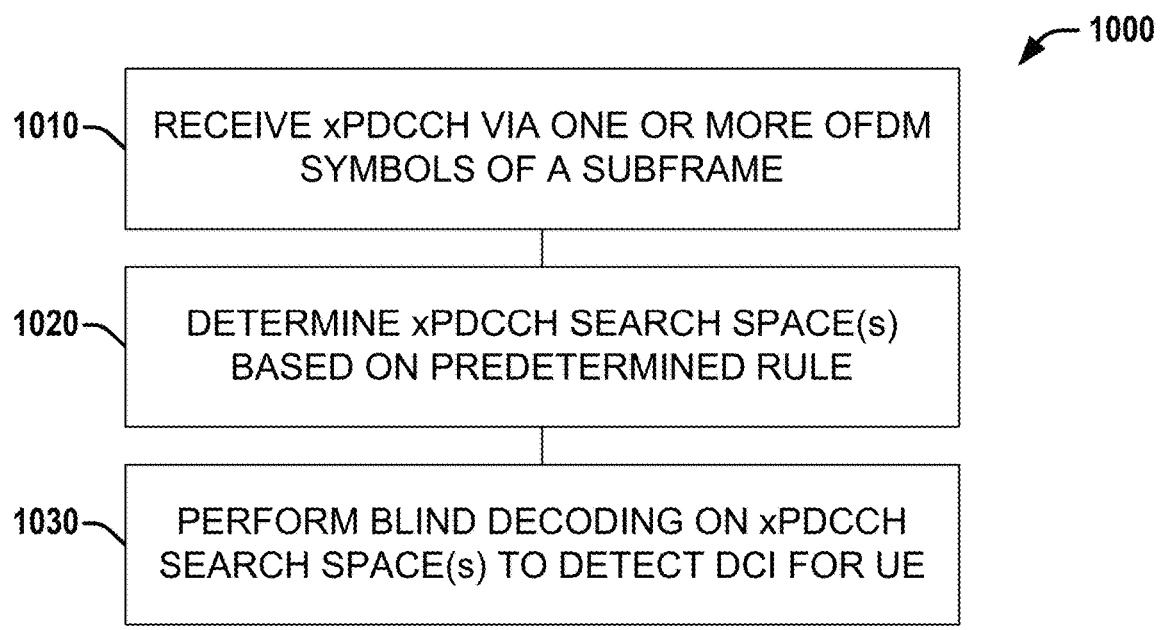
FIG. 10 is a flow diagram of a method that facilitates determination of a xPDCCH search space by a UE based on an xPDCCH design according to various aspects described herein.

Referring to FIG. 10, illustrated is a flow diagram of a method 1000 that facilitates determination of a xPDCCH search space by a UE, according to various aspects described herein. In some aspects, method 1000 can be performed at a UE. In other aspects, a machine readable medium can store instructions associated with method 1000 that, when executed, can cause a UE to perform the acts of method 1000.

At 1010, xPDCCH can be received via one or more OFDM symbols. The number of OFDM symbols, $N_{xPDCCH}^{sym}$, can be predefined or configured via higher layer signaling.

At 1020, a distinct xPDCCH search space can be determined for each of the OFDM symbol(s), which can be based on one of the xPDCCH design rules discussed herein (e.g., xCCE starting positions of the xPDCCH search space(s) can be based on one or more of C-RNTI, subframe index, slot number, symbol index, the number of OFDM symbols for xPDCCH in the subframe (e.g., $N_{xPDCCH}^{sym}$), or xPDCCH set index (for aspects with more than one xPDCCH set per search space)).

At 1030, blind decoding can be performed on each of the xPDCCH search spaces in an attempt to detect xDCI associated with the UE employing method 1000.

Additionally or alternatively, method 1000 can include one or more other acts described herein in connection with determining a xPDCCH search space by a UE, such as in connection with system 800.

Figure 11:
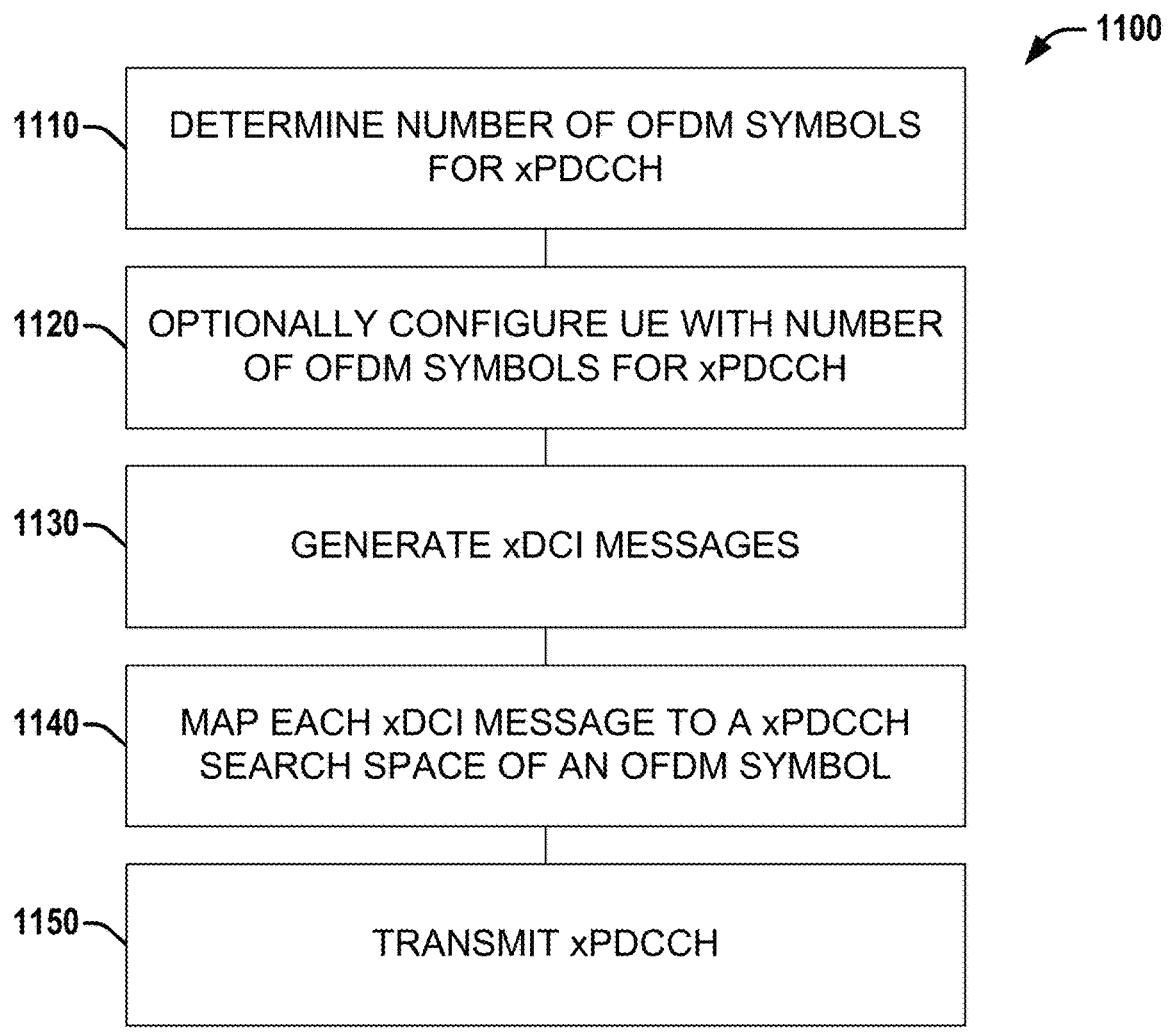
FIG. 11 is a flow diagram of a method that facilitates transmission of DCI messages via an xPDCCH search space for each of one or more OFDM symbols by a base station based on an xPDCCH design according to various aspects described herein.

Referring to FIG. 11, illustrated is a flow diagram of a method 1100 that facilitates transmission of DCI messages via an xPDCCH search space for each of one or more OFDM symbols by a base station, according to various aspects described herein. In some aspects, method 1100 can be performed at an eNB. In other aspects, a machine readable medium can store instructions associated with method 1100 that, when executed, can cause an eNB to perform the acts of method 1100.

At 1110, a number of OFDM symbols ($N_{xPDCCH}^{sym}$) to employ for xPDCCH can be determined, which can be a predefined value, or configurable.

At 1120, if the number of OFDM symbols for xPDCCH is configurable, one or more UEs can be configured with that number via higher layer signaling (e.g., xMIB, xSIB, RRC).

At 1130, one or more xDCI messages can be generated.

At 1140, each xDCI message can be mapped to a xPDCCH search space (e.g., common or UE-specific) of one of the OFDM symbols for xPDCCH.

At 1150, the xPDCCH for each of the $N_{xPDCCH}^{sym}$ OFDM symbols can be transmitted.

Additionally or alternatively, method 1100 can include one or more other acts described herein in connection with generation and/or transmission of xPDCCH, such as in connection with system 900.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed within a User Equipment (UE), comprising: a memory; and one or more processors configured to: determine, for each of one or more orthogonal frequency division multiplexing (OFDM) symbols in a subframe, a distinct fifth generation (5G) physical downlink control channel (xPDCCH) search space in that OFDM symbol, wherein the distinct xPDCCH search space in each of the one or more OFDM symbols is determined based on a predefined rule; and perform blind decoding on the distinct xPDCCH search space in each of the one or more OFDM symbols to decode one or more 5G downlink control information (xDCI) messages.

Example 2 comprises the subject matter of any variation of any of example(s) 1, wherein the distinct xPDCCH search space in each of the one or more OFDM symbols comprises common search space of the distinct xPDCCH search space and a UE-specific search space of the distinct xPDCCH search space.

Example 3 comprises the subject matter of any variation of any of example(s) 1, wherein the distinct xPDCCH search space in each of the one or more OFDM symbols comprises 5G control channel elements (xCCEs).

Example 4 comprises the subject matter of any variation of any of example(s) 1-3, wherein the one or more OFDM symbols comprises two or more OFDM symbols, wherein the two or more OFDM symbols comprise at least a first OFDM symbol and a distinct second OFDM symbol.

Example 5 comprises the subject matter of any variation of any of example(s) 4, wherein the distinct xPDCCH search space in the first OFDM symbol comprises first 5G control channel elements (xCCEs) and the distinct xPDCCH search space in the second OFDM symbol comprises second xCCEs, wherein a starting xCCE position of the first xCCEs is distinct from a starting xCCE position of the second xCCEs.

Example 6 comprises the subject matter of any variation of any of example(s) 5, wherein the starting xCCE position of the second xCCEs has a fixed offset relative to the starting xCCE position of the first xCCEs.

Example 7 comprises the subject matter of any variation of any of example(s) 6, wherein the fixed offset is one of predefined or configured via higher layer signaling, wherein the higher layer signaling comprises one or more of a 5G master information block (xMIB), a 5G system information block (xSIB), or radio resource control (RRC) signaling.

Example 8 comprises the subject matter of any variation of any of example(s) 6, wherein the first xCCEs are a first continuous set of xCCEs, and wherein the second xCCEs are a second continuous set of xCCEs.

Example 9 comprises the subject matter of any variation of any of example(s) 6, wherein the first xCCEs comprise a first pair of distinct sets of xCCEs separated by one or more xCCEs, and wherein the second xCCEs comprises a second pair of distinct sets of xCCEs separated by at least one xCCE.

Example 10 comprises the subject matter of any variation of any of example(s) 6, wherein the starting xCCE position of the first xCCEs and the starting xCCE position of the second xCCEs are both functions of an OFDM symbol index, the fixed offset, and a slot number within a radio frame comprising the subframe.

Example 11 comprises the subject matter of any variation of any of example(s) 1-2, wherein the distinct xPDCCH search space in each of the one or more OFDM symbols comprises 5G control channel elements (xCCEs).

Example 12 comprises the subject matter of any variation of any of example(s) 6-7, wherein the first xCCEs are a first continuous set of xCCEs, and wherein the second xCCEs are a second continuous set of xCCEs.

Example 13 comprises the subject matter of any variation of any of example(s) 6-7, wherein the first xCCEs comprise a first pair of distinct sets of xCCEs separated by one or more xCCEs, and wherein the second xCCEs comprises a second pair of distinct sets of xCCEs separated by at least one xCCE.

Example 14 comprises the subject matter of any variation of any of example(s) 6-7 or 12-13, wherein the starting xCCE position of the first xCCEs and the starting xCCE position of the second xCCEs are both functions of an OFDM symbol index, the fixed offset, and a slot number within a radio frame comprising the subframe.

Example 15 is a machine readable medium comprising instructions that, when executed, cause a User Equipment (UE) to: receive a set of signals via each of one or more orthogonal frequency division multiplexing (OFDM) symbols in a subframe, wherein each of the one or more OFDM symbols comprises a distinct fifth generation (5G) physical downlink control channel (xPDCCH) search space, wherein each distinct xPDCCH search space comprises one or more distinct xPDCCH sets; determine the distinct xPDCCH search space of each of the one or more OFDM symbols based on a predefined rule, wherein the predefined rule defines a 5G control channel element (xCCE) starting position for each distinct xPDCCH set, wherein the xCCE starting position for each distinct xPDCCH set is based at least in part on one or more of a cell radio network temporary identity (C-RNTI), a subframe index of the subframe, a symbol index of the OFDM symbol comprising that distinct xPDCCH set, or a xPDCCH set index of that xPDCCH set; and decode one or more 5G downlink control information (xDCI) messages via blind decoding on the distinct xPDCCH search space in each of the one or more OFDM symbols.

Example 16 comprises the subject matter of any variation of any of example(s) 15, wherein the instructions, when executed, further cause the UE to calculate the xCCE starting position for each distinct xPDCCH set based on a hashing table, wherein the hashing table is initialized with constants that vary between one or more of distinct OFDM symbols of the one or more OFDM symbols, or distinct xPDCCH sets within a given OFDM symbol of the one or more OFDM symbols.

Example 17 comprises the subject matter of any variation of any of example(s) 15, wherein each distinct xPDCCH search space comprises a single continuous xPDCCH set.

Example 18 comprises the subject matter of any variation of any of example(s) 15, wherein each distinct xPDCCH search space comprises a pair of distinct xPDCCH sets separated by one or more xCCEs.

Example 19 comprises the subject matter of any variation of any of example(s) 15-18, wherein the xCCE starting position for each distinct xPDCCH set is based at least in part on a slot number within a radio frame comprising the subframe, and one or more predefined constants.

Example 20 comprises the subject matter of any variation of any of example(s) 15-18, wherein the one or more OFDM symbols comprise $N_{xPDCCH}^{sym}$ OFDM symbols, and wherein the xCCE starting position for each distinct xPDCCH set is based at least in part on $N_{xPDCCH}^{sym}$.

Example 21 comprises the subject matter of any variation of any of example(s) 15-18, wherein the xPDCCH search space of at least one of the one or more OFDM symbols comprises a shortened physical downlink control channel (S-PDCCH) search space.

Example 22 comprises the subject matter of any variation of any of example(s) 21, wherein the xCCE starting position for the S-PDCCH search space is based at least in part on a shortened transmission time interval (S-TTI) index associated with the S-PDCCH search space.

Example 23 comprises the subject matter of any variation of any of example(s) 15-16, wherein each distinct xPDCCH search space comprises a single continuous xPDCCH set.

Example 24 comprises the subject matter of any variation of any of example(s) 15-16, wherein each distinct xPDCCH search space comprises a pair of distinct xPDCCH sets separated by one or more xCCEs.

Example 25 comprises the subject matter of any variation of any of example(s) 15-16 or 23-24, wherein the xCCE starting position for each distinct xPDCCH set is based at least in part on a slot number within a radio frame comprising the subframe, and one or more predefined constants.

Example 26 is an apparatus configured to be employed within an Evolved NodeB (eNB), comprising: a memory; and one or more processors configured to: determine a number of orthogonal frequency division multiplexing (OFDM) symbols for fifth generation (5G) physical downlink control channel (xPDCCH) in a subframe, wherein the number of OFDM symbols for xPDCCH in the subframe is $N_{xPDCCH}^{sym}$; and map downlink control information (DCI) messages for one or more user equipments (UEs) to a distinct xPDCCH search space in each of the first $N_{xPDCCH}^{sym}$ OFDM symbols of the subframe, wherein each distinct xPDCCH search space has a 5G control channel element (xCCE) starting position defined via a predefined rule, wherein the predefined rule is based at least in part on a on one or more of a cell radio network temporary identity (C-RNTI), a subframe index of the subframe, or a symbol index of the OFDM symbol.

Example 27 comprises the subject matter of any variation of any of example(s) 26, wherein each xPDCCH search space comprises a common search space and one or more UE-specific search spaces.

Example 28 comprises the subject matter of any variation of any of example(s) 26, wherein each xPDCCH search space comprises a pair of distinct xPDCCH sets separated by one or more xCCEs.

Example 29 comprises the subject matter of any variation of any of example(s) 26, wherein each xPDCCH search space comprises a continuous set of xCCEs.

Example 30 comprises the subject matter of any variation of any of example(s) 26-29, wherein the one or more processors are further configured to generate higher layer signaling that indicates the value of $N_{xPDCCH}^{sym}$, wherein the higher layer signaling comprises one of a 5G master information block (xMIB), a 5G system information block (xSIB), or radio resource control (RRC) signaling.

Example 31 comprises the subject matter of any variation of any of example(s) 26-29, wherein the $N_{xPDCCH}^{sym}$ OFDM symbols comprises two or more OFDM symbols, and wherein the distinct xPDCCH search space in each of the $N_{xPDCCH}^{sym}$ OFDM symbols has a distinct xCCE starting position.

Example 32 comprises the subject matter of any variation of any of example(s) 26-29 wherein the $N_{xPDCCH}^{sym}$ OFDM symbols comprises two or more OFDM symbols, and wherein each of the distinct xPDCCH search spaces in each of the $N_{xPDCCH}^{sym}$ OFDM symbols have a common xCCE starting position.

Example 33 is an apparatus configured to be employed within a User Equipment (UE), comprising: means for storing instructions; and means for processing configured to execute the instructions to: receive a set of signals via each of one or more orthogonal frequency division multiplexing (OFDM) symbols in a subframe, wherein each of the one or more OFDM symbols comprises a distinct fifth generation (5G) physical downlink control channel (xPDCCH) search space, wherein each distinct xPDCCH search space comprises one or more distinct xPDCCH sets; determine the distinct xPDCCH search space of each of the one or more OFDM symbols based on a predefined rule, wherein the predefined rule defines a 5G control channel element (xCCE) starting position for each distinct xPDCCH set, wherein the xCCE starting position for each distinct xPDCCH set is based at least in part on one or more of a cell radio network temporary identity (C-RNTI), a subframe index of the subframe, a symbol index of the OFDM symbol comprising that distinct xPDCCH set, or a xPDCCH set index of that xPDCCH set; and decode one or more 5G downlink control information (xDCI) messages via blind decoding on the distinct xPDCCH search space in each of the one or more OFDM symbols.

Example 34 comprises the subject matter of any variation of any of example(s) 33, wherein the instructions, when executed, further cause the UE to calculate the xCCE starting position for each distinct xPDCCH set based on a hashing table, wherein the hashing table is initialized with constants that vary between one or more of distinct OFDM symbols of the one or more OFDM symbols, or distinct xPDCCH sets within a given OFDM symbol of the one or more OFDM symbols.

Example 35 comprises the subject matter of any variation of any of example(s) 33, wherein each distinct xPDCCH search space comprises a single continuous xPDCCH set.

Example 36 comprises the subject matter of any variation of any of example(s) 33, wherein each distinct xPDCCH search space comprises a pair of distinct xPDCCH sets separated by one or more xCCEs.

Example 37 comprises the subject matter of any variation of any of example(s) 33-36, wherein the xCCE starting position for each distinct xPDCCH set is based at least in part on a slot number within a radio frame comprising the subframe, and one or more predefined constants.

Example 38 comprises the subject matter of any variation of any of example(s) 33-36, wherein the one or more OFDM symbols comprise $N_{xPDCCH}^{sym}$ OFDM symbols, and wherein the xCCE starting position for each distinct xPDCCH set is based at least in part on $N_{xPDCCH}^{sym}$.

Example 39 comprises the subject matter of any variation of any of example(s) 33-36, wherein the xPDCCH search space of at least one of the one or more OFDM symbols comprises a shortened physical downlink control channel (S-PDCCH) search space.

Example 40 comprises the subject matter of any variation of any of example(s) 39, wherein the xCCE starting position for the S-PDCCH search space is based at least in part on a shortened transmission time interval (S-TTI) index associated with the S-PDCCH search space.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed within a User Equipment (UE), comprising:
    a memory; and
    one or more processors configured to:
        determine, for each of a plurality of orthogonal frequency division multiplexing (OFDM) symbols in a subframe, a distinct fifth generation (5G) physical downlink control channel (xPDCCH) search space in that OFDM symbol, wherein the distinct xPDCCH search space in each of the plurality of OFDM symbols is determined based on a predefined rule and includes a starting 5G control channel element (xCCE) position determined based on a hashing table, wherein the hashing table is initialized with constants that vary between distinct OFDM symbols of the plurality of OFDM symbols; and
        perform blind decoding on the distinct xPDCCH search space in each of the plurality of OFDM symbols to decode one or more 5G downlink control information (xDCI) messages.

2. The apparatus of claim 1, wherein the distinct xPDCCH search space in each of the plurality of OFDM symbols comprises common search space of the distinct xPDCCH search space and a UE-specific search space of the distinct xPDCCH search space.

3. The apparatus of claim 1, wherein the distinct xPDCCH search space in each of the plurality of OFDM symbols comprises xCCEs.

4. The apparatus of claim 1, wherein the plurality of OFDM symbols includes a first OFDM symbol and a second OFDM symbol, wherein the distinct xPDCCH search space in the first OFDM symbol comprises first xCCEs and the distinct xPDCCH search space in the second OFDM symbol comprises second xCCEs, wherein the starting xCCE position of the first xCCEs is distinct from the starting xCCE position of the second xCCEs.

5. The apparatus of claim 4, wherein the first xCCEs are a first continuous set of xCCEs, and wherein the second xCCEs are a second continuous set of xCCEs.

6. The apparatus of claim 4, wherein the first xCCEs comprise a first pair of distinct sets of xCCEs separated by one or more xCCEs, and wherein the second xCCEs comprises a second pair of distinct sets of xCCEs separated by at least one xCCE.

7. The apparatus of claim 4, wherein the starting xCCE position of the first xCCEs and the starting xCCE position of the second xCCEs are both functions of an OFDM symbol index, the fixed offset, and a slot number within a radio frame comprising the subframe.

8. A non-transitory machine readable medium comprising instructions that, when executed, cause a User Equipment (UE) to:

receive a set of signals via each of one or more orthogonal frequency division multiplexing (OFDM) symbols in a subframe, wherein each of the one or more OFDM symbols comprises a distinct fifth generation (5G) physical downlink control channel (xPDCCH) search space, wherein each distinct xPDCCH search space comprises one or more distinct xPDCCH sets;

determine the distinct xPDCCH search space of each of the one or more OFDM symbols based on a predefined rule, wherein the predefined rule defines a 5G control channel element (xCCE) starting position for each distinct xPDCCH set, wherein the xCCE starting position for each distinct xPDCCH set is based at least in part on one or more of a cell radio network temporary identity (C-RNTI), a subframe index of the subframe, a symbol index of the OFDM symbol comprising that distinct xPDCCH set, or a xPDCCH set index of that xPDCCH set;

calculate the xCCE starting position for each distinct xPDCCH set based on a hashing table, wherein the hashing table is initialized with constants that vary between one or more of distinct OFDM symbols of the one or more OFDM symbols, or distinct xPDCCH sets within a given OFDM symbol of the one or more OFDM symbols; and decode one or more 5G downlink control information (xDCI) messages via blind decoding on the distinct xPDCCH search space in each of the one or more OFDM symbols.

9. The machine readable medium of claim 8, wherein each distinct xPDCCH search space comprises a single continuous xPDCCH set.

10. The machine readable medium of claim 8, wherein each distinct xPDCCH search space comprises a pair of distinct xPDCCH sets separated by one or more xCCEs.

11. The machine readable medium of claim 8, wherein the xCCE starting position for each distinct xPDCCH set is based at least in part on a slot number within a radio frame comprising the subframe, and one or more predefined constants.

12. The machine readable medium of claim 8, wherein the one or more OFDM symbols comprise $N_{xPDCCH}^{sym}$ OFDM symbols, and wherein the xCCE starting position for each distinct xPDCCH set is based at least in part on $N_{xPDCCH}^{sym}$.

13. The machine readable medium of claim 8, wherein the xPDCCH search space of at least one of the one or more OFDM symbols comprises a shortened physical downlink control channel (S-PDCCH) search space.

14. The machine readable medium of claim 13, wherein the xCCE starting position for the S-PDCCH search space is based at least in part on a shortened transmission time interval (S-TTI) index associated with the S-PDCCH search space.

15. The machine readable medium of claim 8, wherein the one or more OFDM symbols comprises two or more OFDM symbols.

16. An apparatus configured to be employed within an Evolved NodeB (eNB), comprising:

a memory; and one or more processors configured to:

determine a number of orthogonal frequency division multiplexing (OFDM) symbols for fifth generation (5G) physical downlink control channel (xPDCCH) in a subframe, wherein the number of OFDM symbols for xPDCCH in the subframe is $N_{xPDCCH}^{sym}$ and has a value of two or more; and map downlink control information (DCI) messages for one or more user equipments (UEs) to a distinct xPDCCH search space in each of the first $N_{xPDCCH}^{sym}$ OFDM symbols of the subframe, wherein each distinct xPDCCH search space has a 5G control channel element (xCCE) starting position defined via a predefined rule, wherein the predefined rule is based at least in part on one or more of a cell radio network temporary identity (C-RNTI), a subframe index of the subframe, or a symbol index of the OFDM symbol, and wherein the xCCE starting position is determined based on a hashing table, wherein the hashing table is initialized with constants that vary between distinct OFDM symbols of the number of OFDM symbols.

17. The apparatus of claim 16, wherein each xPDCCH search space comprises a common search space and one or more UE-specific search spaces.

18. The apparatus of claim 16, wherein each xPDCCH search space comprises a pair of distinct xPDCCH sets separated by one or more xCCEs.

19. The apparatus of claim 16, wherein each xPDCCH search space comprises a continuous set of xCCEs.

20. The apparatus of claim 16, wherein the one or more processors are further configured to generate higher layer signaling that indicates the value of $N_{xPDCCH}^{sym}$, wherein the higher layer signaling comprises one of a 5G master information block (xMIB), a 5G system information block (xSIB), or radio resource control (RRC) signaling.

21. The apparatus of claim 16, wherein the distinct xPDCCH search space in each of the $N_{xPDCCH}^{sym}$ OFDM symbols has a distinct xCCE starting position.

* * * * *